(12) United States Patent
Sellen et al.

(10) Patent No.: US 11,927,308 B2
(45) Date of Patent: Mar. 12, 2024

(54) DIFFERENTIAL PRESSURE OPENING AND EXCESS FLOW CLOSING VALVE FOR GAS CYLINDER

(71) Applicant: Rotarex S.A., Lintgen (LU)

(72) Inventors: Stephan Sellen, Wehingen (DE); Philippe Schmitz, Steinsel (LU)

(73) Assignee: ROTAREX S.A., Lintgen (LU)

( * ) Notice: Subject to any disclaimer, the term of this patent is extended or adjusted under 35 U.S.C. 154(b) by 138 days.

(21) Appl. No.: 17/630,406

(22) PCT Filed: Jul. 17, 2020

(86) PCT No.: PCT/EP2020/070366
§ 371 (c)(1),
(2) Date: Jan. 26, 2022

(87) PCT Pub. No.: WO2021/018642
PCT Pub. Date: Feb. 4, 2021

(65) Prior Publication Data
US 2022/0282836 A1    Sep. 8, 2022

(30) Foreign Application Priority Data

Jul. 26, 2019   (LU) .......................................... 101328

(51) Int. Cl.
*F17C 13/04* (2006.01)
*F16K 17/30* (2006.01)

(52) U.S. Cl.
CPC .............. *F17C 13/04* (2013.01); *F16K 17/30* (2013.01); *F17C 2203/0636* (2013.01);
(Continued)

(58) Field of Classification Search
CPC ............... Y10T 137/7765; F17C 13/04; F17C 2205/0329; F17C 2205/0385; F16K 17/30; F16K 17/10
See application file for complete search history.

(56) References Cited

U.S. PATENT DOCUMENTS 3,545,484 A  * 12/1970  Allen ..................... F16K 17/105
                                                           137/490
3,844,312 A    10/1974  Sumner et al.
(Continued)

FOREIGN PATENT DOCUMENTS

JP         2007278484 A     10/2007

OTHER PUBLICATIONS

International Search Report for PCT/EP2020/070366 dated Sep. 16, 2020.
Written Opinion for PCT/EP2020/070366 dated Sep. 16, 2020.

*Primary Examiner* — Jessica Cahill
(74) *Attorney, Agent, or Firm* — Sandberg Phoenix & von Gontard P.C.

(57) ABSTRACT

A valve for a fluid, comprising: a body with an inlet, an outlet and a passage fluidly interconnecting the inlet and outlet; a shut-off device housed in the body and configured for selectively opening and closing the passage, the shut-off device comprising a main seat, a main closing element forming a channel extending there through and a pilot seat, a pilot closing element housed in the main closing element, a first compression spring, and a second compression spring; an actuating device of the shut-off device. The second compression spring is operatively mounted between the main closing element and the body and the first compression spring is stronger than the second compression spring.

19 Claims, 4 Drawing Sheets

(52) U.S. Cl.
CPC ............... *F17C 2205/0329* (2013.01); *F17C 2205/0385* (2013.01); *F17C 2223/0123* (2013.01); *F17C 2223/036* (2013.01); *F17C 2227/048* (2013.01)

(56) References Cited

U.S. PATENT DOCUMENTS

| | | | | |
|---|---|---|---|---|
| 4,077,422 | A * | 3/1978 | Brinkley | F17C 13/12 137/68.14 |
| 5,275,086 | A * | 1/1994 | Stallings, Jr. | F15B 15/1433 137/328 |
| 5,794,652 | A * | 8/1998 | Mukumoto | F16K 17/105 137/474 |
| 5,848,608 | A * | 12/1998 | Ishigaki | F16K 41/10 251/60 |
| 5,871,156 | A * | 2/1999 | Lawson | B05B 15/74 239/206 |
| 7,984,890 | B2 * | 7/2011 | Pfaff | G05D 7/0635 251/30.01 |
| 9,500,298 | B2 * | 11/2016 | Alikhani | F16K 3/267 |
| 2008/0196772 | A1 | 8/2008 | Shin | |
| 2010/0252770 | A1 | 10/2010 | Lin et al. | |
| 2015/0192213 | A1 | 7/2015 | Nomichi et al. | |
| 2016/0097444 | A1 | 4/2016 | Nashery et al. | |
| 2020/0173609 | A1 * | 6/2020 | Stephan | F17C 13/04 |

\* cited by examiner

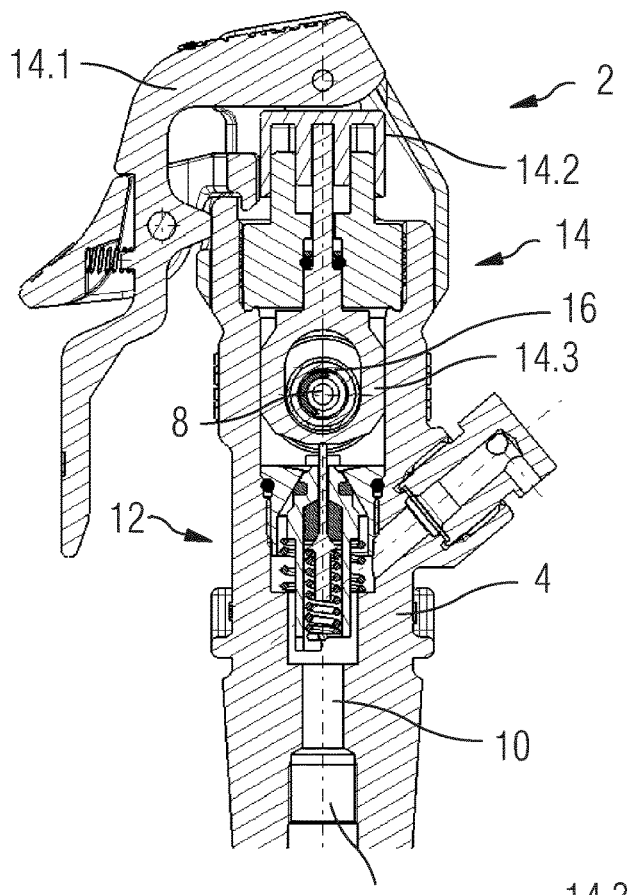

DIFFERENTIAL PRESSURE OPENING AND EXCESS FLOW CLOSING VALVE FOR GAS CYLINDER

The present invention is the US national stage under 35 U.S.C. § 371 of International Application No. PCT/EP2020/070366 which was filed on Jul. 17, 2020, and which claims the priority of application LU 101328 filed on Jul. 26, 2019, the content of which (text, drawings and claims) are incorporated here by reference in its entirety.

FIELD

The invention is directed to the field of valves for fluid, in particular for compressed gas, more particularly for industrial compressed gas and for being mounted on gas cylinders.

BACKGROUND

Prior art patent document published U.S. Pat. No. 3,844,312 discloses a valve for a fluid, for instance for liquefied petroleum gas tanks. The valve comprises a body that houses a shut-off device comprising a main seat and a pilot seat, for achieving a slow opening and an automatic closing in case of excess flow rate. The shut-off device comprises a main seat, a main closure element with a central passage for the fluid and a pilot seat, and a pilot closing element normally resting on said pilot seat. A first compression spring is operably mounted between the main closing element and the pilot closing element, and a second compression spring, concentric inside the first one, operatively mounted between the valve body and the pilot closing element. A cam device is provided for actuating the pilot closing element by moving said element away from the pilot seat, opening the passage and building up a counter-pressure downstream of the shut-off device. Once the pressure difference (i.e. pressure upstream minus pressure downstream) become less than the force exerted by the first compression spring, the main closing element moves away from the main seat and opens in full the passage. In the event that piping downstream of the valve experiences a break, the counter-pressure will become lower such that the above pressure difference will become greater than the force of the first compression spring, so that the main closing element will contact the main seat and close the main passage. The pilot passage will also close further to the engagement of an enlarged-diameter plug portion of the stem of the pilot closing element with a corresponding orifice in the pilot closing element.

The above teaching is interesting in that it provides on one side a slow-opening of the passage and on the other side an automatic closing of said passage in case of a too high flow rate or a loss of counter pressure. The construction of the valve is however bulky, in particular radially, and therefore not quite practicable for industrial compressed gas, i.e., at about 200 bars and on gas cylinder with a neck that shows a limited diameter.

Patent documents published US 2010/0252770 A1 and US 2016/0097444 A1 disclose similar valves for fluid with a main closing element and a pilot closing element.

SUMMARY

The invention has for technical problem to overcome at least one of the drawbacks of the above cited prior art. More specifically, the invention has for technical problem to provide a valve with a controlled opening function and/or automatic closing function in case of excess flow specially adapted for industrial compressed gas, i.e., for gas cylinders.

According to a first aspect, the invention is directed to a valve for a fluid, in particular for compressed gas, comprising a body with an inlet, an outlet and a passage fluidly interconnecting the inlet and outlet; a shut-off device housed in the body and configured for selectively opening and closing the passage, the shut-off device comprising a main seat, a main closing element configured for cooperating with the main seat and forming a channel extending there through and a pilot seat, a pilot closing element housed in the main closing element and configured for cooperating with the pilot seat, a first compression spring operatively mounted between the pilot closing element and the main closing element, and a second compression spring configured for biasing the main closing element towards the main seat; an actuating device configured for moving the pilot closing element away from the pilot seat and open the passage through the channel and, once a counter-pressure has built up downstream of the main closing element, move the main closing element away from the main seat; wherein the second spring is operatively mounted between the main closing element and the body and in a shut-off state of the shut-off device, the first compression spring is stronger than the second compression spring.

When defining the compression springs as operatively mounted between two elements, it is to be understood that the compression spring acts directly on the two elements.

According to an exemplary embodiment, the second compression spring surrounds the main closing element.

According to an exemplary embodiment, the main closing element shows an outer cylindrical surface housed in a sliding fashion in at least one bore of the body, the outer cylindrical surface showing a least one longitudinal cut-out forming the passage along the main closing element.

According to an exemplary embodiment, each of the least one longitudinal cut-out forms a flattened surface.

According to an exemplary embodiment, the least one longitudinal cut-out comprises at least three cut-outs distributed around the main closing element on the outer cylindrical surface.

According to an exemplary embodiment, the outer cylindrical surface of the main closing element comprises, relative the main seat, a distal portion housed in a distal bore of the body, with a first diameter, and a proximal portion housed in a proximal bore of the body, with a second diameter greater than the first diameter.

According to an exemplary embodiment, the outer cylindrical surface of the main closing element forms a shoulder between the distal portion and the proximal portion, the second compression spring resting on the shoulder.

According to an exemplary embodiment, the main seat is formed on a cylindrical element that is housed in a cavity formed in the body, the cylindrical element comprising a through-hole forming the passage.

According to an exemplary embodiment, the cylindrical element comprises an outer thread engaged with an inner thread of the cavity, the cylindrical element comprising a front face opposed to the main seat and provided, at an outer periphery, with prongs for engaging with a tool for screwing the cylindrical element in the cavity.

According to an exemplary embodiment, the proximal bore is formed in the cylindrical element.

According to an exemplary embodiment, the main seat is a conical surface adjacent the proximal bore.

According to an exemplary embodiment, the channel in the main closing element comprises a bore distal to the main seat and a through-hole proximal to the main seat, the pilot closing element being elongate with a distal portion, a proximal portion and a collar portion between the distal and proximal portions, the collar portion being housed in a sliding fashion in the bore and the proximal portion extending through the through-hole.

According to an exemplary embodiment, the first compression spring is slid around the distal portion of the pilot closing element and rests on the collar portion.

According to an exemplary embodiment, the pilot seat is formed by a cylindrical block of non-metallic material that is inserted into the bore of the main closing element.

According to an exemplary embodiment, the first compression spring is operatively mounted on the main closing element by resting on a pin that is inserted transversally into the main closing element.

According to an exemplary embodiment, the main closing element comprises a conical front surface with a groove housing a gasket configured for cooperating with the main seat. The gasket can an elastomer vulcanized in the groove.

According to an exemplary embodiment, the main closing element comprises a rear face distal to the main seat, configured for abutting against a circular shoulder in the body when the main closing element is away from the main seat, the rear face showing at least one transversal cut-out forming the passage at the circular shoulder when the rear face abuts against the circular shoulder.

According to an exemplary embodiment, the pilot closing element freely protrudes out of the main closing element when the shut-off device in a closed state, the actuating device being configured for contacting and moving the pilot closing element without contacting the main closing element. Freely protruding out of the main closing element means that no guiding means fixed with the body is provided.

According to a second aspect, the invention is also directed to a valve for a fluid, in particular for compressed gas, comprising a body with an inlet, an outlet and a passage fluidly interconnecting the inlet and outlet; a shut-off device housed in the body and configured for selectively opening and closing the passage, the shut-off device comprising a main seat, a main closing element configured for cooperating with the main seat, forming a channel extending there through and a pilot seat, a pilot closing element housed in the main closing element and configured for cooperating with the pilot seat; an actuating device configured for moving the pilot closing element away from the pilot seat and open the passage through the channel and, once a counter-pressure has built up downstream of the main closing element move the main closing element away from the main seat; wherein the main closing element shows an outer cylindrical surface housed in a sliding fashion in at least one bore of the body, the outer cylindrical surface showing a least one longitudinal cut-out forming the passage between the inlet and the shut-off device.

The above features of the various exemplary embodiments of the first aspect are herewith also disclosed in combination with the second aspect.

More specifically, the shut-off device can comprise a single compression spring. Also the actuating device can comprise an elastic system through which the actuating force is transmitted and be configured for contacting also the main closing element for moving the element.

Alternatively, the shut-off device can comprise a first compression spring operatively mounted between the pilot closing element and the main closing element, and a second compression spring configured for biasing the main closing element towards the main seat.

The invention is particularly interesting in that it provides solutions for rendering the valve compact and suitable for gas compressed at high pressures, i.e., at least 200 bar, and for being mounted on a gas cylinder. Both the first and second aspects solve that particular problem. In the above cited prior art U.S. Pat. No. 3,844,312, the shut-off device is particularly bulky radially. Thanks to the invention, according to both first and second aspects, the shut-off device can be designed much more compact, in particular radially.

DRAWINGS

FIG. 1 is an exemplary sectional view of a valve according to various embodiments of the invention, a closed state.

FIG. 2 is an enlarged view of the shut-off device of the valve of FIG. 1, in accordance with various embodiments of the invention.

DETAILED DESCRIPTION

Figure 3:
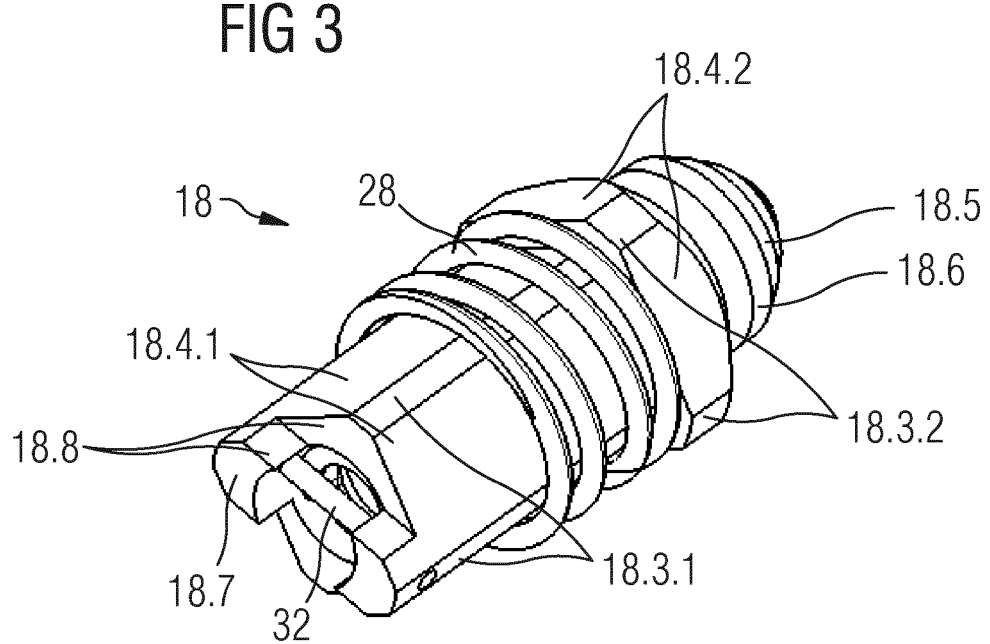
FIGS. 3 and 4 are two perspective views of the main closing element of the shut-off device of the valve of FIGS. 1 and 2, in accordance with various embodiments of the invention.

FIGS. 1 and 2 are sectional views of a valve according to the invention, in a closed stated.

FIG. 1 is a complete view of the valve.

The valve 2 comprises a body 4 with a gas inlet 6, a gas outlet 8 and a gas passage 10 interconnecting the inlet with the outlet. The gas outlet 8 is not well visible for it extends perpendicularly to the plane of the section. The body 4 is advantageously made of metal like steel, stainless steel or brass. The body 4 shows at its lower end, at the gas inlet 6, a tapering male thread designed for engaging with a female thread on a neck of gas cylinder.

The valve 2 comprises also a shut-off device 12 housed in the body 4 and configured for selectively opening or closing the gas passage 10. The shut-off device is operated by an actuating device 14. For instance, the actuating device 14 comprises a pivoting lever 14.1 with a cam, a tappet 14.2 moving axially along the longitudinal axis of the valve for converting with the cam the pivoting movement of the lever 14.1 into a translation, and a push rod 14.3. For instance, the push-rod shows a lower enlarged portion that is slidably received in a longitudinal central cavity of the body 4. That enlarged portion shows an opening that is crossed by a residual pressure valve 16. Such a valve is optional. It can comprise a tubular portion forming a cartridge housing a piston urged by a spring and that cooperates with a seat formed for instance on the body. The opening in the enlarged portion of the push rod is designed, for instance oblong, for allowing a translation movement along the longitudinal axis without interfering with the residual pressure valve 16.

FIG. 2 is an enlarged view of the shut-off device 12 of the valve in FIG. 1.

The shut-off device 12 comprises essentially, a main closing element 18 cooperating with a main seat 20, a pilot closing element 22 cooperating with a pilot seat 24 formed on the main closing element 18, a first compression spring operatively mounted between the main closing element 18 and the pilot closing element 22, and a second compression spring 28 operatively mounted between the main closing element 18 and the body 4.

More specifically, the main closing element 18 forms a central channel 18.1 and 18.2 extending through the element, the pilot closing element 22 being configured for closing that channel under the resilient force of the first compression spring 26. The channel in the main closing element 18 comprises a through-hole 18.1 that is proximal to the main seat 20 and a bore that is distal to the main seat 20. The pilot closing element 22 comprises a proximal portion 22.1 of a reduced diameter extending through the through-hole 18.1, a distal portion 22.2 located in the bore 18.2 and a collar portion 22.3 located between the proximal and distal portions and housed in a sliding fashion in the bore 18.2. The pilot seat 24 is formed for instance by a conical surface in a cylindrical block 30 made of a material that is softer than metal, e.g. a non-metallic material. The pilot closing element 22 comprises a corresponding conical surface at the junction between the pin-shaped proximal portion 22.1 and the collar portion 22.3 for contacting the conical surface of the pilot seat 24. As this is apparent, the bore 18.2 in the distal portion of the main closing element 18 shows a constant diameter so that the cylindrical block 30 forming the pilot seat 24 can be inserted into the bore. It can be press-fitted so that it remains in position without further measure or action.

The first compression spring 26, at one end, engages around the distal portion 22.2 of the pilot closing element 22 and abuts against the collar portion 22.3 thereof. The other end of the first compression spring 26 abuts against a pin 32 that is inserted transversally into the main closing element 18.

In the closed state as illustrated in FIG. 1, the first compressing spring 26 urges the pilot closing element 22 against the pilot seat 24 so as to close the channel 18.1 and 18.2 formed in the main closing element 18. Also the second compression spring 28 urges the main closing element 18 against the main seat 20. The gas passage 10 is therefore closed. The inlet pressure acting on the main closing element 18 and on the pilot closing element 22 upstream of the main and pilot seats 20 and 24, respectively, urges these elements against their seats and therefore further tends to close the passage. That pressure can be of several hundred bar.

As this is apparent in FIG. 2, the pin-shaped proximal portion 22.1 of the pilot closing element 22 protrudes out of the main closing element 18 and is in contact or at least in vis-à-vis of the push rod 14.3 of the actuating device 14. Upon operation of the actuating device, the push rod 14.3 will be moved, for instance lowered, so as to move the pilot closing element 22 away from the pilot seat 24 and open the gas passage through the channel 18.1 and 18.2 in the main closing element 18. During that movement, the first compression spring 26 will be further compressed and transmit a force to the main closing element 18 tending to move it away from its seat 20. The force resulting from the inlet pressure on the main closing element 18, as mentioned here above, and added to the force of the second compression spring 28 is however greater than that resilient force. However, once gas flows through the channel 18.1 and 18.2, a counter-pressure on the downstream side of the main closing element 18 will build up with downstream connected equipment. The resulting force on the main closing element 18, originating from the gas pressure, will be reduced until the sum of that resulting force and the force of the second compression spring 28 is lower than the resilient force of the first compression spring 26. From that moment, the main closing element 18 will move away from the main seat 20 and fully open the gas passage 10. This will be detailed in connection with FIGS. 5 to 8.

The above means that if the valve's outlet 8 is not connected to a downstream equipment, no counter pressure is built up and the main closing element 18 remains in contact with the main seat 20 until the cylinder pressure reaches a very low value, removing the risk of cylinder tipping over by a sudden and strong gas flow out of the outlet 8.

Figure 4:
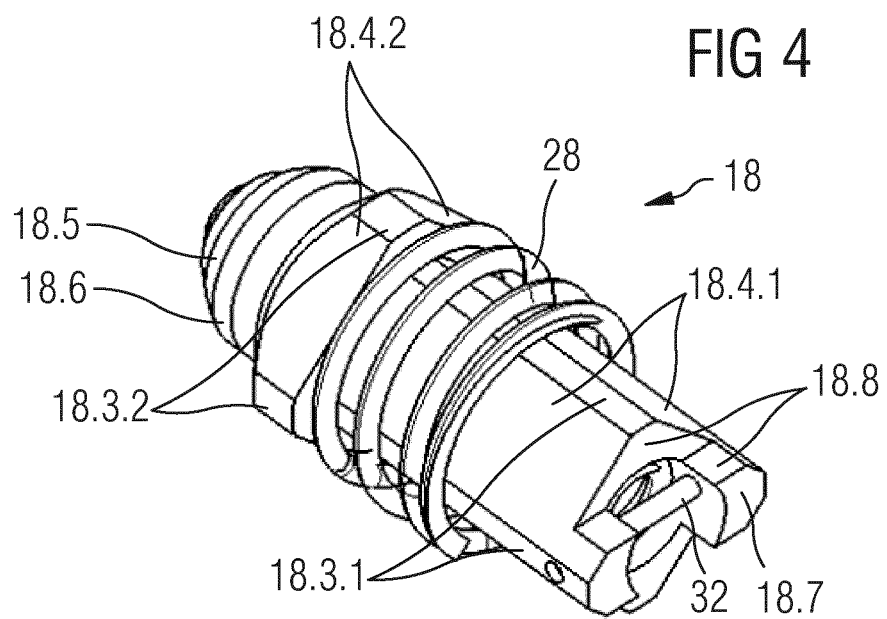

FIGS. 3 and 4 are two perspective views of the main closing element 18 of the shut-off device 12 of the valve of FIGS. 1 and 2. As this is apparent, the main closing element 18 shows a generally cylindrical outer surface 18.3.1 and 18.3.2 to be received in a sliding fashion in at least one bore formed in the body. This generally cylindrical outer surface shows however cut-outs 18.4.1 and 18.4.2 that form passage for the gas between that outer surface and the at least one bore in the body. These cut-outs are for instance four flattened areas distributed around the main closing element 18. More specifically, the generally cylindrical outer surface comprises, relative to the main seat, a distal portion 18.3.1 and a proximal portion 18.3.2 with a larger diameter. A shoulder is formed between these two portions, the second compression spring 28 resting on that shoulder.

The main closing element 18 comprises a front conical surface 18.5 with a circular groove receiving a gasket 18.6 that can be vulcanised in the groove. The main closing element 18 comprises a rear face 18.7 that is generally perpendicular to the longitudinal axis of the main closing element 18 and showing at least one transversal cut-out 18.8, for instance two cut-outs. The rear face 18.7 is intended to abut against a shoulder formed in the body when in a fully opened position, and the cut-outs 18.8 form the gas passage in that position.

Back to FIG. 2, the body 4 shows a first bore 34.1 and a second bore 34.2 with a diameter that is less the diameter of the first bore 34.1. The distal portion 18.3.1 (not visible in FIG. 2 but well in FIGS. 3 and 4) of the outer cylindrical surface of the main closing element 18 is slidably received in the second bore 34.2. The sectional view in FIG. 2 shows an important radial airgap because the section is made in the cut-outs 18.4.1, that airgap corresponding to the thickness of the cut-outs.

Still with reference to FIG. 2, the valve comprises a cylindrical element 36 mounted in the cavity of the body 4, for instance by screwing. That cylindrical element 36 forms the main seat 20 and forms also a bore 36.1 that is adjacent the main seat 20. The proximal portion 18.3.2 (not visible in FIG. 2 but well in FIGS. 3 and 4) of the outer cylindrical surface of the main closing element 18 is slidably received in that bore 36.1. Similarly to the distal portion, the sectional view shows an important radial airgap because the section is made in the cut-outs 18.4.2, that airgap corresponding to the thickness of the cut-outs.

The cylindrical element 36 can comprise, on a front face that is opposite to the main seat 20 and at an outer periphery, prongs 36.2 for engaging with a tool for screwing the cylindrical element in the cavity.

Figure 5:
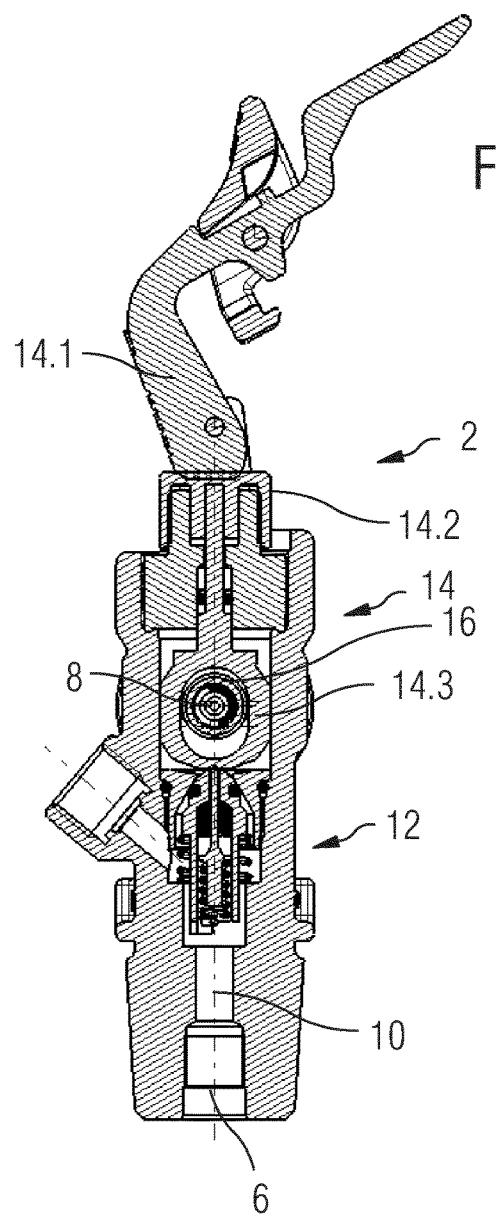
FIG. 5 is a sectional view of the valve of FIGS. 1 and 2 however in a partly opened state, in accordance with various embodiments of the invention.
Figure 6:
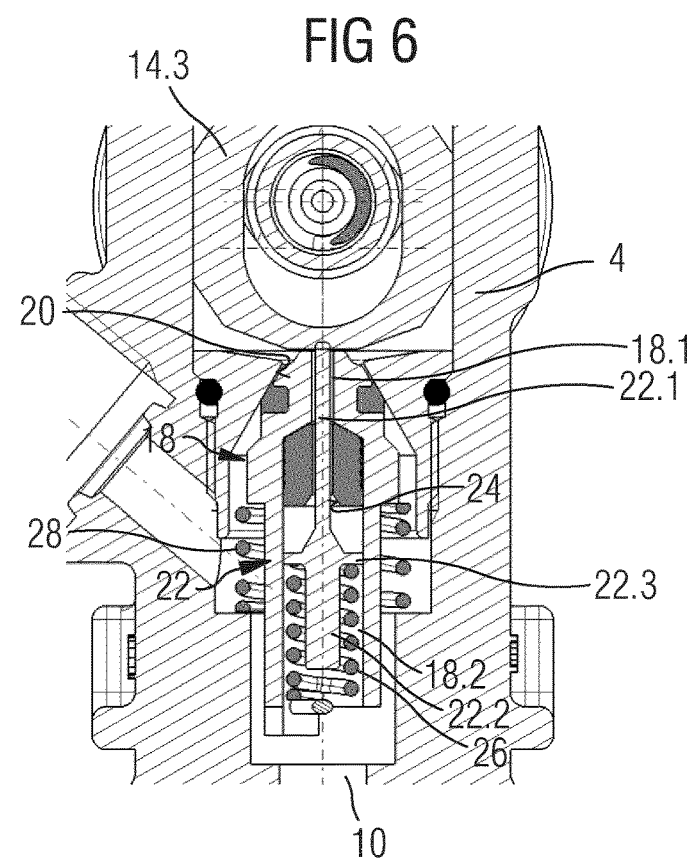
FIG. 6 is an enlarged view of the shut-off device of the valve of FIG. 5, in accordance with various embodiments of the invention.

FIGS. 5 and 6 are sectional views of a valve according to the invention, in a partly opened state.

FIG. 5 is a complete view of the valve. As this is apparent, the section is still along the longitudinal axis but reversed. The lever 14.1 of the actuating device is lifted so that its cam presses the tappet 14.2 to a lower position and lowers the push rod 14.3 so as to move the pilot closing element off the pilot seat.

FIG. 6 is an enlarged view of the shut-off device 12 of the valve in FIG. 5.

The pilot closing element 22 is moved down away from the pilot seat 24, thereby allowing the gas to flow at a reduced rate through the channel 18.2 and 18.1 of the main closing element 18. More specifically, the gas flows along the annular space between the distal portion 22.2 of the pilot closing element 22 and the bore 18.2 in the main closing element 18, along the first compression spring 26, thereafter between the collar portion 22.3 of the pilot closing element 22 and the bore 18.2 in the main closing element 18, and then between the pin-shaped proximal portion 22.1 of the pilot closing element 22 and the through-hole in the cylinder block 30 forming the pilot seat 24. The mechanical play between the outer surface of the collar portion 22.3 and the bore 18.2 can be dimensioned such that the resulting cross-section is less than the resulting cross-section downstream between the pin-shaped proximal portion 22.1 and the through-hole in the cylinder block 30. In various instances, the resulting cross-section between the collar portion 22.3 and the bore 18.2 is less than 20% of the resulting cross-section between the pin-shaped proximal portion 22.1 and the through-hole in the cylinder block 30. This allows, at the very beginning of the opening of the channel 18.1 and 18.2, the gas flowing with high speed between the collar portion 22.3 and the bore 18.2 to expand directly downstream of the collar portion 22.3 before passing through the cylinder block 30, thereby limiting the potential damages to the block.

In FIG. 6, the main closing element 18 is still in contact with the main seat 20 because the force of the push rod 14.3 transmitted by the first compression spring 26 is less than the opposite force being the sum of the force exerted by the second compression spring 28 and the force resulting of the gas pressure on the main closing element 18. However, the gas flowing at limited rate through the channel 18.2 and 18.1 allows a counter-pressure to build up on the downstream side of the main closing element 18 up to point where the sum of the force exerted by the second compression spring 28 and the force resulting of the gas pressure on both sides of the main closing element 18 becomes less than the opposite force of the first compression spring 26. In that situation, the main closing element 18 starts moving down and opening the passage between the main closing element 18 and the main seat 20.

Figure 7:
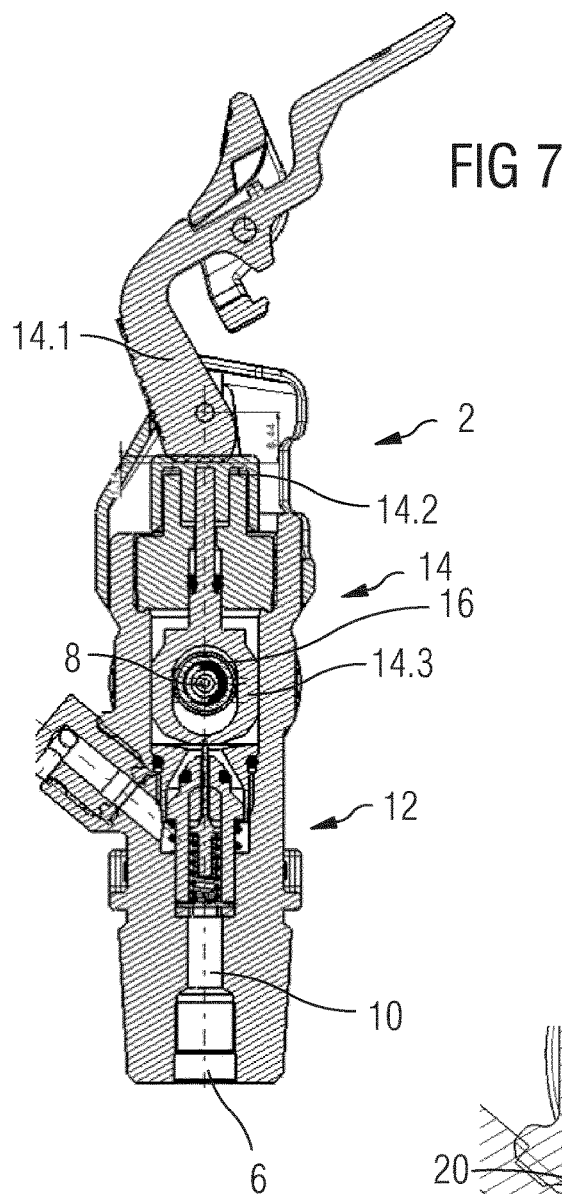
FIG. 7 is a sectional view of the valve of FIGS. 1, 2, 5 and 6 however in a totally opened state, in accordance with various embodiments of the invention.
Figure 8:
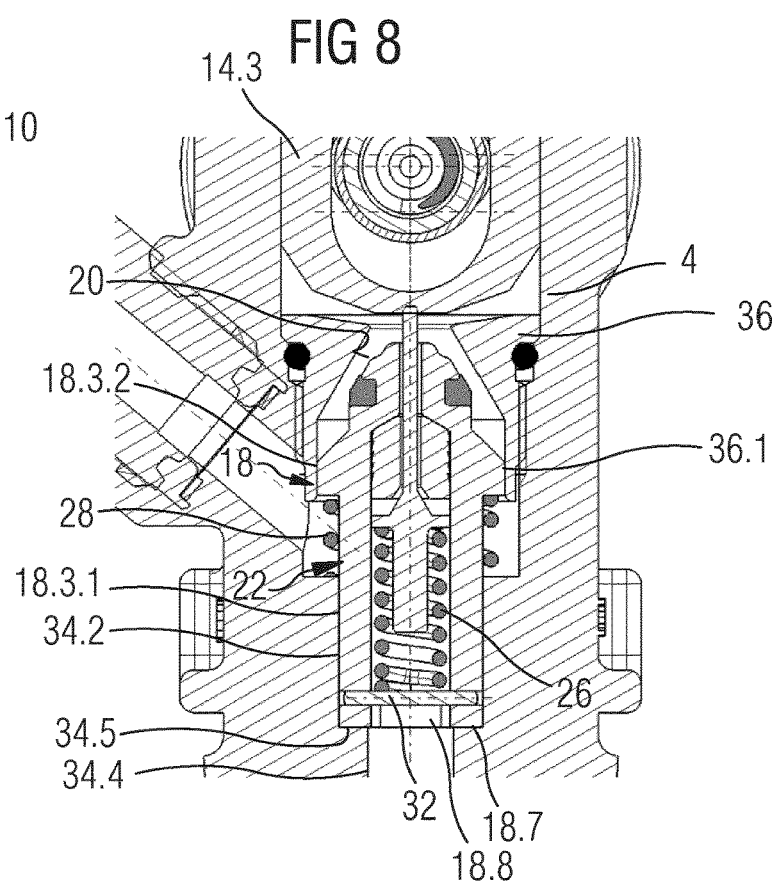
FIG. 8 is an enlarged view of the shut-off device of the valve of FIG. 7, in accordance with various embodiments of the invention.

FIGS. 7 and 8 are sectional views of a valve according to the invention, in a totally opened state.

FIG. 7 is a complete view of the valve. The actuating device 14 is in the same position as in FIGS. 5 and 6.

FIG. 8 is an enlarged view of the shut-off device 12 of the valve in FIG. 7.

The forces exerted on the main closing element 18 by the gas pressure tending to close the main closing element 18 are not sufficient anymore for compensating the opposite opening force exerted by the first compression spring 26, better said the difference between the force exerted by the first compression spring 26 and the force exerted by the second compression spring 28.

As this is apparent, the rear face 18.7 of the main closing element 18 abuts against a circular shoulder 34.5 formed in the body 4 between the second bore 34.2 and a third bore 34.4 of a lower diameter. With reference to FIGS. 3 and 4 and the corresponding passage of the description, the transversal cut-outs 18.8 in the rear face 18.7 form the gas passage 10 at the circular shoulder 34.5. In that position of the main closing element 18, the force resulting of the gas pressure on both sides of the main closing element 18 is minimum. This means that the first and second compression springs 26 and 28 are dimensioned such that, in that position of the main closing element 18, the force exerted by the first compression spring 26 is greater than the sum of the force exerted by the second compression spring 28 and the force resulting of the gas pressure on both sides of the main closing element 18.

Important is to observe that in FIGS. 7 and 8 the angular position of the main closing element 18 is different from the previous figures. The angular position of the main closing element 18 is such that the section plane crosses the cylindrical outer surfaces 18.3.1 and 18.3.2 (see also FIGS. 3 and 4). In FIG. 8 we can observe that these surfaces 18.3.1 and 18.3.2 are guided by the bores 34.2 and 36.1. Also we can observe that the pin 32 (see also FIGS. 3 and 4) extends in the plane of the section.

The exemplary embodiments of the invention which has been described here above is one non-limiting example, among many, of working the invention.

The invention claimed is:

1. A valve for a fluid, said valve comprising:
   a body with an inlet, an outlet and a passage fluidly interconnecting the inlet and outlet;
   a shut-off device housed in the body and configured for selectively opening and closing the passage, the shut-off device comprising
   a main seat,
   a main closing element configured for cooperating with the main seat and forming a channel extending there through and a pilot seat,
   a pilot closing element housed in the main closing element and configured for cooperating with the pilot seat,
   a first compression spring operatively mounted between the pilot closing element and the main closing element, and
   a second compression spring configured for biasing the main closing element towards the main seat; and
   an actuating device configured for moving the pilot closing element away from the pilot seat and opening the passage through the channel and, once a counter-pressure has built up downstream of the main closing element, move the main closing element away from the main seat,
   wherein the second compression spring is operatively mounted between the main closing element and the body and, at least in a shut-off state of the shut-off device, the first compression spring is stronger than the second compression spring.

2. The valve according to claim 1, wherein the second compression spring surrounds the main closing element.

3. The valve according to claim 1, wherein the main closing element shows an outer cylindrical surface housed in a sliding fashion in at least one bore of the body, the outer cylindrical surface showing at least one longitudinal cut-out forming the passage along the main closing element.

4. The valve according to claim 3, wherein each of the least one longitudinal cut-out forms a flattened surface.

5. The valve according to claim 3, wherein the least one longitudinal cut-out comprises at least three cut-outs distributed around the main closing element on the outer cylindrical surface.

6. The valve according to claim 3, wherein the outer cylindrical surface of the main closing element comprises, relative the main seat, a distal portion housed in a distal bore of the body, with a first diameter, and a proximal portion housed in a proximal bore of the body, with a second diameter greater than the first diameter.

7. The valve according to claim 6, wherein the outer cylindrical surface of the main closing element forms a shoulder between the distal portion and the proximal portion, the second compression spring resting on said shoulder.

8. The valve according to claim 1, wherein the main seat is formed on a cylindrical element that is housed in a cavity formed in the body, said cylindrical element comprising a through-hole forming the passage.

9. The valve according to claim 8, wherein the cylindrical element comprises an outer thread engaged with an inner thread of the cavity, the cylindrical element comprising a front face opposed to the main seat and provided, at an outer periphery, with prongs for engaging with a tool for screwing the cylindrical element in the cavity.

10. The valve according to claim 8, wherein a proximal bore of the body is formed in the cylindrical element.

11. The valve according to claim 10, wherein the main seat is a conical surface adjacent the proximal bore.

12. The valve according to claim 1, wherein the channel in the main closing element comprises a bore distal to the main seat and a through-hole proximal to the main seat, the pilot closing element being elongate with a distal portion, a proximal portion and a collar portion between the distal and proximal portions, the collar portion being housed in a sliding fashion in the bore and the proximal portion extending through the through-hole.

13. The valve according to claim 12, wherein the first compression spring is slid around the distal portion of the pilot closing element and rests on the collar portion.

14. The valve according to claim 12, wherein the pilot seat is formed by a cylindrical block of non-metallic material that is inserted into the bore of the main closing element.

15. The valve according to claim 1, wherein the first compression spring is operatively mounted on the main closing element by resting on a pin that is inserted transversally into the main closing element.

16. The valve according to claim 1, wherein the main closing element comprises a conical front surface with a groove housing a gasket configured for cooperating with the main seat.

17. The valve according to claim 1, wherein the main closing element comprises a rear face distal to the main seat, configured for abutting against a circular shoulder in the body when the main closing element is away from the main seat, the rear face showing at least one transversal cut-out forming the passage at the circular shoulder when said rear face abuts against said circular shoulder.

18. The valve according to claim 1, wherein the pilot closing element freely protrudes out of the main closing element when the shut-off device is in a closed state, the actuating device being configured for contacting and moving the pilot closing element without contacting the main closing element.

19. A valve for a fluid, said valve comprising:
a body with an inlet, an outlet and a passage fluidly interconnecting the inlet and outlet;
a shut-off device housed in the body and configured for selectively opening and closing the passage, the shut-off device comprising:
a main seat,
a main closing element configured for cooperating with the main seat, forming a channel extending there through and a pilot seat,
a pilot closing element housed in the main closing element and configured for cooperating with the pilot seat; and
an actuating device configured for moving the pilot closing element away from the pilot seat and open the passage through the channel and, once a counter-pressure has built up downstream of the main closing element, move the main closing element away from the main seat,
wherein the main closing element shows an outer cylindrical surface housed in a sliding fashion in at least one bore of the body, the outer cylindrical surface showing a least one longitudinal cut-out forming the passage along the main closing element.

\* \* \* \* \*